United States Patent [19]

Watanabe et al.

[11] Patent Number: 5,028,809
[45] Date of Patent: Jul. 2, 1991

[54] COMPUTER BUS STRUCTURE PERMITTING REPLACEMENT OF MODULES DURING OPERATION

[75] Inventors: Tak Watanabe, Los Altos; John J. Youden; Terry P. O'Brien, both of Cupertino; Donald A. Telian, Roseville, all of Calif.

[73] Assignee: Hewlett-Packard Company, Palo Alto, Calif.

[21] Appl. No.: 320,137

[22] Filed: Mar. 7, 1989

[51] Int. Cl.⁵ .............................................. H01H 1/50
[52] U.S. Cl. ..................................... 307/137; 307/134
[58] Field of Search ................ 361/393, 396; 307/134, 307/137; 439/92

[56] References Cited

U.S. PATENT DOCUMENTS

| | | | |
|---|---|---|---|
| 3,432,795 | 3/1969 | Jayne | 439/60 |
| 3,993,935 | 11/1976 | Phillips et al. | 439/59 |
| 4,034,172 | 7/1977 | Glover et al. | 439/181 |
| 4,079,440 | 3/1978 | Ohnuma et al. | 361/424 |
| 4,084,875 | 4/1978 | Yamamoto | 439/274 |
| 4,146,291 | 3/1979 | Goff et al. | 439/90 |
| 4,152,750 | 5/1979 | Bremenour et al. | 361/393 |
| 4,412,712 | 11/1983 | Reimer et al. | 439/64 |
| 4,510,553 | 4/1985 | Paultersak | 361/413 |
| 4,549,036 | 10/1985 | Reichbach | 439/924 |
| 4,579,406 | 4/1986 | Laursen et al. | 439/62 |
| 4,679,121 | 7/1987 | Schomers et al. | 361/393 |
| 4,738,632 | 4/1988 | Schmidt et al. | 361/393 |
| 4,767,337 | 8/1988 | Kawasaki et al. | 439/34 |

Primary Examiner—A. D. Pellinen
Assistant Examiner—Jeffrey A. Gaffin
Attorney, Agent, or Firm—Roland I. Griffin; Alan H. Haggard

[57] ABSTRACT

A computer bus structure is provided which permits replacement of removable modules during operation of a computer wherein means are provided to precharge signal output lines to within a predetermined range prior to the usage of the signal output lines to carry signals, and further, wherein means are provided to minimize arcing to pins designed to carry the power and signals of a connector. In a specific embodiment, pin length, i.e., separation between male and female components of the connector, are subdivided into long pin length and short pin length. Ground connections and power connections for each voltage level are assigned to the long pin lengths. Signal connections and a second power connection for each voltage level is assigned to the short pin lengths. The precharge/prebias circuit comprises a resistor divider coupled between a power source and ground with a high impedance tap coupled to a designated signal pin, across which is coupled a charging capacitor or equivalent representing the capacitance of the signal line. Bias is applied to the precharge/prebias circuit for a sufficient length of time to precharge the signal line to a desired neutral signal level between expected high and low signal values prior to connection of the short pin to its mate.

10 Claims, 2 Drawing Sheets

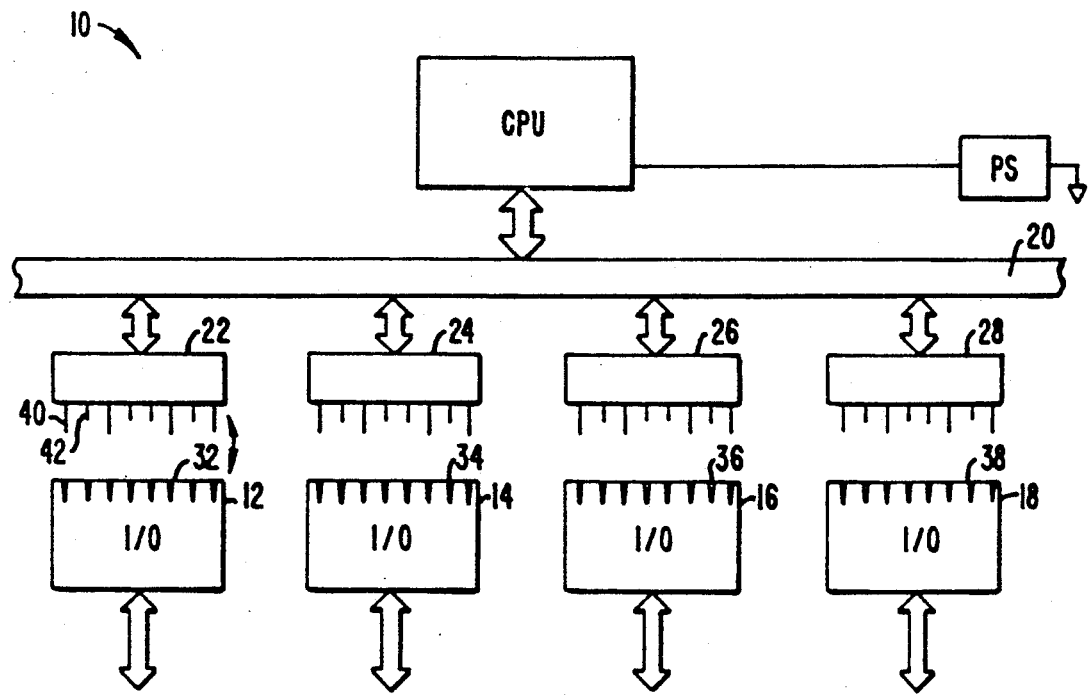
FIG._1.
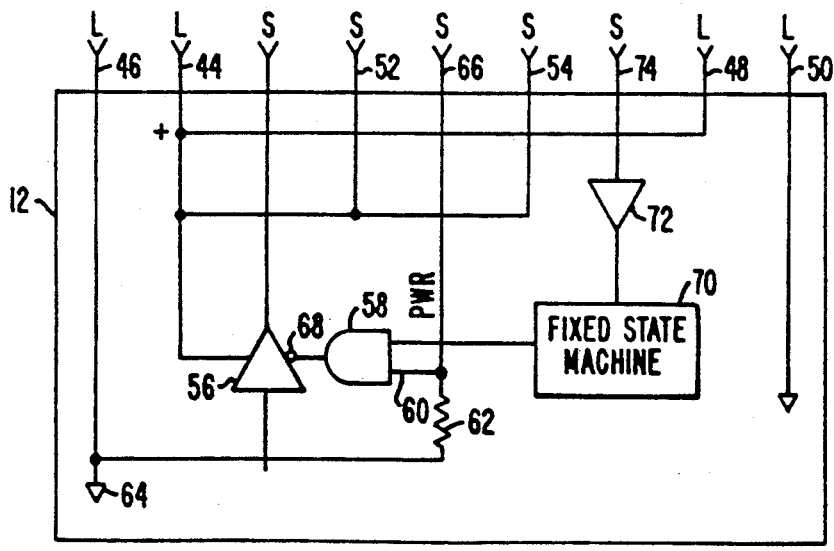
FIG._2.

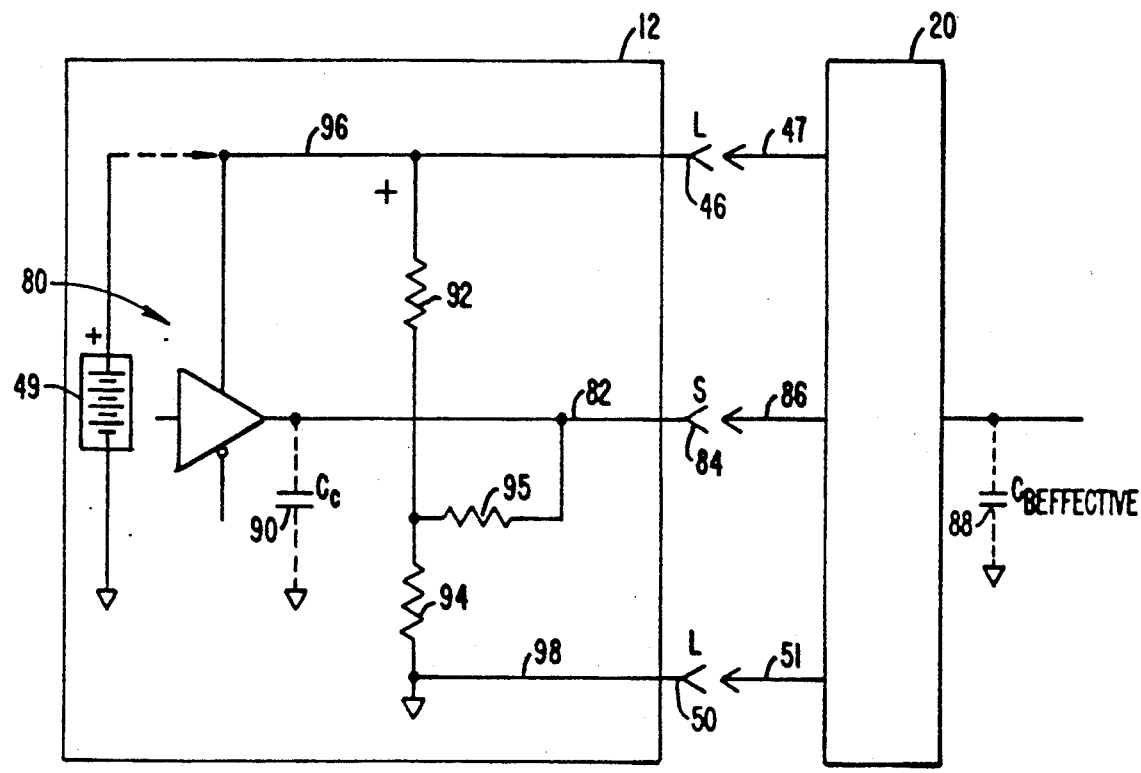
FIG._3.

COMPUTER BUS STRUCTURE PERMITTING REPLACEMENT OF MODULES DURING OPERATION

BACKGROUND OF THE INVENTION

This invention relates to structures of computer buses and the like which permit insertion and withdrawal of connectors for modules such as printed circuit boards during powered operation.

It is frequently desirable for electronic systems, and in particular computer systems to operate continuously. Computer systems typically comprise modules interconnected through a bus structure in a backplane. The modules or subsystems are generally separately addressable under control of operating systems software.

Insertion and withdrawal of a module from a backplane through a module connector and the backplane connector during operation of the backplane where there is application of power through the backplane presents numerous problems. Undesired transient signals can be created during the insertion or removal process which disturb backplane logic signals. Arcing between contacts occurs whenever power is instantaneously applied or removed from a contact if there is a significant capacitive or inductive component in the power source or the load.

What is needed is a mechanism for addressing the problem of undesired transients in signals and power which would permit online withdrawal and insertion of modules, as part of a scheme for online replacement or repair by module exchange in an operating computer system.

SUMMARY OF THE INVENTION

According to the invention, a computer bus structure is provided which permits replacement of removable modules during operation of a computer wherein means are provided to precharge signal output lines to within a predetermined range prior to the usage of the signal output lines to carry signals, and further, wherein means are provided to minimize arcing to pins designed to carry the power and signals of a connector In a specific embodiment, pin length, i.e., separation between male and female components of the connector, are subdivided into long pin length and short pin length. Ground connections and power connections for each voltage level are assigned to the long pin lengths. Signal connections and a second power connection for each voltage level is assigned to the short pin lengths. The precharge/prebias circuit comprises a resistor divider coupled between a power source and ground with a high-impedance tap coupled to a designated signal pin, across which is coupled a charging capacitor or equivalent representing the capacitance of the signal line. Bias is applied to the precharge/prebias circuit for a sufficient length of time to precharge the signal line to a desired neutral signal level between expected high and low signal values prior to connection of the short pin to its mate.

The precharge/prebias may have a power source that consists of either an onboard battery, a monkey cable or a source of power through the long pins.

The invention is better understood by reference to the following detailed description in connection with the accompanying drawings.

BRIEF DESCRIPTION OF THE DRAWINGS

FIG. 1 is a block diagram of a computer system with a bus having sockets connectable to modules which can be inserted and withdrawn while power is applied to the computer system.

FIG. 2 is a schematic diagram of features includable in a removable module.

FIG. 3 is a schematic diagram of a prebias circuit coupled to a computer bus in accordance with the invention.

DESCRIPTION OF SPECIFIC EMBODIMENTS

Referring to FIG. 1, there is shown a computer system 10 suited to on line replacement of modules 12, 14, 16, 18 coupled to a bus 20. The computer bus 20 is provided with connectors, which can be either sockets or plugs, and herein depicted as plugs 22, 24, 26 and 28, which mate with corresponding sockets 32, 34, 36, 38 of the circuit modules 12, 14, 16 and 18, respectively.

The plugs, for example, representative plug 22, are provided with pins of different lengths or intended separation distance from a mating pin receiver. For example, there is a category of pin designated long pin 40 and a category of pin designated a short pin 42. By long and short it is meant that the separation between the long pin and its mating pin receiver in a socket is less than the separation between a short pin and it mating socket. (All pins may be of the same physical length if the pin receivers of the sockets are displaced such that the separation between the long pins and the socket is less than the separation between short pins and the socket.)

Referring to FIG. 2, the longs pins may include according to the invention, sacrificial pin 44, 48 and a ground pin 46, 50. The ground pin is used to establish connection with a ground potential when the modules 12 is first inserted and to maintain a ground potential until the module 12 is fully withdrawn. For each level of voltage, particularly for d.c. voltage above 5 volts, a sacrificial pin is provided, which is a long pin designed to encounter a corresponding socket 44 before a signal is established through the module 12. The sacrificial pin is a pin designated to withstand damage caused by arcing during the mating process when a module is inserted and during the demating process when a module is removed. During the mating process, the long pin is juxtaposed to its mating socket to a point where arcing occurs. Arcing and connection upon insertion begins to charge capacitance that is usually required on the voltage lines in electronic circuits. As the insertion progresses, the capacitance of the circuit becomes fully charged. Thereupon, the short pin or pins mate to complete the insertion process. Selected short pins carry the circuit operating power under normal operating conditions. The short pins carrying power are permanently electrically coupled to long pins intended to carry power of the corresponding voltage. Because the short power pins are not subject to arcing, short power pins provide a more reliable connection to voltage. Examples of short power pins are pins mating to sockets 52 and 54.

Pins may be redundant especially symmetrically redundant, in a connector such that slight misalignment of the mating portions does not change the mating characteristics and so that the current-carrying capacity of the connector is increased as current is distributed.

As a further protection against stray signals, output drivers, such as output driver 56, are subject to enablement through three-state control as for example, through an AND gate 58 having one input 60 biased through a biasing resistor 62 to ground 64 through a long pin 46. The initial bias is overcome by a "power-on" signal applied through a short pin through socket 66 to the AND gate 58 through input 60. Control and other operation of the signals can be enabled by means of a three-state Enable input 68 in response to the signal through the AND gate 58 which, in turn, is responsive to a fixed state machine or random logic 70 driven through driver 72 in response to a signal received through a socket 74 coupled to a corresponding short pin.

Referring now to FIG. 3, there is shown a precharge/prebiasing circuit 80 in accordance with the invention. To prevent the insertion of a module 12 from disturbing logic signals on the backplane 20, means are provided to assure that the inserted module 12 biases its output to the signal line 82 to a logic level which is intermediate of its expected high and low logic levels. When so biased and precharged, transient noise created upon contact between the signal line 82 through its socket 84 and the corresponding pin 86 does not cause logic faults. Associated with each backplane 20 is an effective capacitance $C_B$ represented here by capacitor 88. Associated with each signal-carrying circuit is an effective circuit capacitance $C_C$ represented here by capacitor 90. The capacitor 90 is generally of a value substantially smaller than that of capacitor 88, although it is significant. Unless the effective capacitance 90 is precharged and prebiased, there will occur a switching transient which has an amplitude proportional to the required change in voltage across the effective capacitance 90 to match the voltage on the circuit pin 86 of the backplane 20. A biasing circuit, comprising resistor 92 resistor 94, and resistor 95 forming a voltage divider, is provided as one example of a biasing circuit. Resistor 92 is coupled between a node with resistor 95 and a power line 96, wherein the power line 96 has power applied to it prior to the making of a connection on socket 84. The resistor 94 is coupled between the node with resistor 95 and a zero or ground reference 98, for example, coupled to a socket 50 to a long pin 51. Resistor 95 is coupled to signal line 82 from the node with resistors 92 and 94.

The biasing circuit requires a zero voltage reference prior to signal application to the output. The power bias relative to the zero voltage reference can be provided by a variety of options. In accordance with the invention, the power for the bias circuit can be provided through a socket 46 to a long pin 47, or optionally through a battery 49 in the module coupled between a ground reference and the power line for the bias circuit.

The bias circuit is preferably of high impedance so as not to interfere with the signal of any output driver. The RC time constant formed by capacitor 90 and the parallel-series combination of resistors 92, 94 and 95 should be sufficiently short to permit the line 82 to charge to its desired intermediate level between the time of insertion, connection of the power carrying-line at socket 46 and the signal carrying line at socket 84. To assure that the impedance is sufficiently high, the feeder resistor 95 should be of sufficiently high resistance.

The invention has now been explained with reference to specific embodiments. Other embodiments will be apparent to those of ordinary skill in the art. It is therefore not intended that this invention be limited, except as indicated in the appended claims.

We claim:

1. A computer bus structure including removable modules to permit replacement of removable modules connectable to a bus during operation of a computer comprising:
    a plurality of connectors coupled to bus lines of said bus for connecting said removable modules to said bus lines;
    drivers within each said removable module for coupling signals on output signal lines to said bus through said connectors; and
    means for setting output level of output signal lines of said drivers prior to connection to said connectors, said output setting means comprising a high-impedance voltage divider coupled to said output signal lines and having a voltage terminal coupled to a voltage reference connection and a reference terminal coupled to a zero-voltage reference connection, said voltage reference connection being activated to a predetermined voltage level prior to connection of said output signal lines to said bus.

2. The bus structure according to claim 1 wherein said connectors comprise first pins and second pins, and wherein said removable modules comprise first pin receiving means and second pin receiving means said first pins being disposed to mate with said first pin receiving means prior to the mating of said second pins with said second pin receiving means upon insertion of said removable modules into said connectors.

3. The bus structure according to claim 2 wherein said first pins include first power connections for each one of a selected number of voltage levels, and said second pins include second power connections coupled directly to a corresponding first pin for each one of said selected number of voltage levels, said first power connection being disposed to encounter initial making of a power connection and final breaking of a power connection at each power level in order to absorb and dissipate arcing due to voltage differentials and current differentials between said modules and said bus, thereby to provide hot safe mating and reliable power-carrying connection through said second pins.

4. The bus structure according to claim 1 wherein said drivers comprise three-state drivers, and wherein said modules include means for establishing disassertion of a power-on signal received from a power-on signal pin as a default state whenever said module is at least partially disconnected from said bus, and wherein each said three-state driver is constrained by said disassertion means to default to a passive state during disassertion of said power-on signal.

5. The bus structure according to claim 1 wherein said connectors comprise first pin receiving means and second pin receiving means and wherein said removable modules comprise first pins and second pins, said first pin receiving means being disposed to mate with said first pin means prior to the mating of said second pin receiving means with said second pins upon insertion of said removable modules into said connectors.

6. A computer bus structure including removable modules to permit replacement of removable modules during operation of a computer comprising:
    a plurality of connectors coupled to bus lines for connecting input/output modules to said bus lines, each of said connectors having first and second interface pins, said first interface pins being of a first defined length, and said second interface pins being of a second defined length shorter than said first defined length;

selected ones of said first pins being coupled to ground connections, to zero voltage reference connections, and to power supply connections for driver elements of said input/output modules;

selected ones of said second pins being coupled to power supply connections and corresponding first pins;

means within each said module for establishing disassertion of a power-on signal received from a power-on signal pin as a default state whenever said removable module is at least partially disconnected from said connector; and three-state drivers within each said removable module, each one of said three-state drivers defaulting to a passive state during disassertion of said power-on signal.

7. The bus structure according to claim 6 wherein selected ones of said first pins are redundant in order to distribute current loads during plug-in to extend voltage range for hot safe mating.

8. The bus structure according to claim 6 wherein said three-state drivers include means for setting outputs thereof to a default voltage in a midrange between asserted and disasserted in order to minimize voltage transients on said bus lines.

9. The bus structure according to claim 8 wherein said output setting mans comprises a high-impedance tap on a voltage divider coupled between a voltage reference connection coupled to one of said first pins and a zero-voltage reference connection coupled to one of said first pins.

10. The bus structure according to claim 6 wherein power supply connections are distributed among selected ones of said second pins in order to distribute power loads of said removable module.

* * * * *